(12) United States Patent
Wahl

(10) Patent No.: US 7,705,770 B2
(45) Date of Patent: Apr. 27, 2010

(54) SYSTEM AND METHOD FOR SUPPRESSING IFF RESPONSES IN THE SIDELOBES AND BACKLOBES OF IFF INTERROGATOR ANTENNAS

(75) Inventor: Robert Wahl, Kings Park, NY (US)

(73) Assignee: Telephonics, Inc., Farmingdale, NY (US)

( * ) Notice: Subject to any disclaimer, the term of this patent is extended or adjusted under 35 U.S.C. 154(b) by 280 days.

(21) Appl. No.: 11/183,569

(22) Filed: Jul. 18, 2005

(65) Prior Publication Data

US 2006/0284759 A1    Dec. 21, 2006

(51) Int. Cl.
   *G01S 13/78*    (2006.01)
(52) U.S. Cl. ...................................... 342/45
(58) Field of Classification Search ............... 342/42–51
   See application file for complete search history.

(56) References Cited

U.S. PATENT DOCUMENTS

| | | | | |
|---|---|---|---|---|
| 3,267,462 A | * | 8/1966 | Gabriel | 342/51 |
| 3,422,437 A | * | 1/1969 | Marston | 343/754 |
| 3,438,038 A | * | 4/1969 | Marston | 343/754 |
| 3,594,811 A | * | 7/1971 | Pierrot | 342/350 |
| 4,145,692 A | * | 3/1979 | Armstrong et al. | 342/173 |
| 4,196,436 A | * | 4/1980 | Westerman | 342/380 |
| 4,348,679 A | * | 9/1982 | Shnitkin et al. | 343/768 |
| 4,595,926 A | * | 6/1986 | Kobus et al. | 342/368 |
| 4,897,659 A | * | 1/1990 | Mellon | 342/45 |
| 4,910,521 A | * | 3/1990 | Mellon | 342/45 |
| 5,038,406 A | * | 8/1991 | Titterton et al. | 398/125 |
| 5,218,365 A | * | 6/1993 | Woodall | 342/39 |
| 5,225,839 A | * | 7/1993 | Okurowski et al. | 342/174 |
| 5,245,347 A | * | 9/1993 | Bonta et al. | 342/149 |
| 6,693,580 B1 | * | 2/2004 | Wehling | 342/45 |

* cited by examiner

*Primary Examiner*—Thomas G Black
*Assistant Examiner*—Shelley Chen
(74) *Attorney, Agent, or Firm*—Thomas A. O'Rourke; Bodner & O'Rourke, LLP

(57) ABSTRACT

An IFF interrogation system for use on an aircraft is described. The system transmits a signal from an interrogator to a transponder and from the transponder to the interrogator. The system includes a non-reciprocal IFF antenna that breaks either an uplink signal or a downlink signal at any given angle outside the main beam. The IFF transmitter transmits an Uplink Σ signal and an Uplink Δ signal to the IFF antenna.

10 Claims, 6 Drawing Sheets

Non-Reciprocal IFF Antenna Technique

Figure 1 Non-Reciprocal IFF Antenna Technique

Figure 2 Uplink Σ and Δ Patterns

Figure 3 Downlink Uplink $\Sigma$ and $\Delta$ Patterns

SYSTEM AND METHOD FOR SUPPRESSING IFF RESPONSES IN THE SIDELOBES AND BACKLOBES OF IFF INTERROGATOR ANTENNAS

This is a conversion of U.S. Provisional Patent Application Ser. No. 60/588,461, filed Jul. 16, 2004, the disclosures of which are incorporated herein by reference.

FIELD OF THE INVENTION

The present invention relates to antennas in Interrogate Friend or Foe (IFF) Systems for implementing Interrogator Side Lobe Suppression (ISLS) and Receive Side Lobe Suppression (RSLS) functions in the rear hemisphere.

BACKGROUND OF THE INVENTION

Throughout time, it has always been important to know who one's friends are. Nowhere has this been more obvious than in military conflicts, where for centuries, flags, banners, insignia and uniforms have allowed adversaries to distinguish their cohorts from others who might have less friendly intentions. And, in darkness, when those visual means of identification were impossible, the business of using passwords and countersigns achieved the same end.

That system worked for millennia as long as conflicts were more or less face to face and visual identification was possible. But about 50 years ago, just as World War II began, the widespread use of aircraft caused a dramatic and inexorable change. Because threats could now approach with great speed by the time the visual identification was possible, it was often too late to prevent destruction. Also, while battle forces were once drawn up on opposing sides of some geographic line in the past, the new battle zones quickly became chaotic mixtures of friendly and hostile forces with many isolated units operating autonomously, thus making identification of others on the battle field nearly impossible.

Visual means were and still are an important method of discriminating between friends and enemies. But airplanes now fly at night, are extremely fast, fly at high altitude and can attack outside of visual range, thus making additional means of detection vital to survival in combat.

The earliest forms of radar were just emerging during WW II and, although it seemed to offer a solution to the problem, a major drawback soon became evident. The radar could detect incoming aircraft at considerable distance by sending out powerful pulses of radio energy and detect the echoes that were sent back, but it could not tell what kind of aircraft had been spotted or to whom they belonged.

The first recorded attempt at an electronic Interrogator Friend or Foe ("IFF") system was used by the Germans during WW II. By rolling their planes over when they received a predetermined signal, the Germans pilots would change the polarization of the radar reflections picked up by their own ground radars. The pilots created a distinctive blip on the radars that differed from others so the radar operators could identify their friendly forces. This simple yet effective attempt to distinguish their planes from enemy planes to German radar operators incorporated the basic structure of all cooperative IFF systems that followed: a challenge or question (the coded radio message) and a specific response (the roll over that caused a change in the reflected radar signal). This maneuver was a passive system in that the returned signal was still just a reflection of the radar energy sent from the ground.

The first active system employed radio energy generated on the target aircraft which was then used as the return signal identifying the aircraft. This is the basic method now used in all modern cooperative IFF systems. The Mk I was an active IFF system and was put into service in about 1940. It used a receiver aboard each aircraft that broke into oscillation and acted as a transmitter when it received a radar signal. Because of the variety of radar frequencies used, it had to be mechanically tuned across the radar bands in order to be triggered by any radar that was illuminating it. This mechanical tuning requirement and other factors limited its performance. The Mk II was a later improvement of the Mk I, it had a separate transmitter that was tuned through the radar bands simultaneously with the receiver and was triggered by signals from the receiver. This greatly increased the strength of the return signal and the return range. It also could be programmed to respond in one of six different codes thus providing some further degree of identification. The MK II was triggered in the radar bands while the MK III operated in the VHF band.

After the war, with rapid technical developments creating new high performance aircraft, the need for efficient and reliable IFF systems led to a long series of further refinements that eventually evolved into the modern IFF systems in use today. Modern IFF systems are basically Question/Answer systems. An interrogator system sends out a coded radio signal that asks any number of queries. The interrogator system is frequently associated with a primary radar installation, but it may also be installed aboard a ship or another aircraft. The interrogation code or challenge, as it is called, is received by an electronic system known as a transponder that is aboard the target aircraft. If the transponder receives the proper electronic code from an interrogator, it automatically transmits the requested identification back to the interrogating system as a coded radio signal. Because it was developed as an adjunct to the primary echo-type detection radar and is usually used in conjunction with a primary radar, the IFF system is also known as secondary radar.

As noted above, the military purpose of IFF is identification of friendly aircraft by the use of identification codes on the transmission and reply. In this case, called IFF 'Interrogation', an aircraft can be requested by either a ground station, land/sea vehicle or another aircraft fitted with an Interrogator to reply to a coded request for identification. Only friendly aircraft who know the code of the day can provide the correct response to the Interrogation. On most military aircraft the IFF Interrogator, which requires extra 'black boxes' and antennas to those of the IFF Transponder, is often enacted by mounting the IFF Interrogator antennas on the main radar dish. In this way, when an aircraft is detected by that radar, it can be selectively interrogated by the directional radar dish, without broadcasting the interrogating aircraft's position through the omnidirectional transmissions typical of Transponder systems.

Modern IFF systems use two channels. Typically 1030 Megahertz is used for interrogating signals and 1090 Megahertz is used for reply signals, but other frequencies may be used as IFF systems change. The IFF system begins when an IFF interrogator attempts to exchange information with its target by establishing an uplink to the transponder. IFF interrogation may be between two aircraft, between a ground based radar station and an aircraft, a tank and an aircraft or a missile system and an aircraft. The transponder accepts the interrogator's request for an uplink by signaling back to the interrogator and thus creating a downlink. The link is established between the interrogator and a transponder over a small azimuth angular extent of the main lobe of the antenna in the direction the antenna is pointing. The antenna used to establish the links between the interrogator and the transponder have other lobes besides the main lobe including but not limited to side lobes and rear lobes, if a link is established in more than one lobe this will create a "ghost" image making it appear as if there are two or more transponders rather than one.

To preclude links from being established in the side lobes, Sidelobe Suppression techniques are implemented for both the uplink and the downlink. For example, Interrogator Side Lobe Suppression (ISLS) and Receiver Side Lobe Suppression (RSLS) have been used for this purpose. Some IFF Interrogation installations, such as those on aircraft, require the vertical size of the IFF antenna to be severely limited. Small vertical aperture IFF antennas will typically have a strong back lobe due to a strong forward to rear RF coupling. The backlobe problem can also be compounded by aircraft installation effects including the platform body and the radome. In systems that use a difference beam to cover the sum beam for Interrogator Side Lobe Suppression (ISLS) and Receiver Side Lobe Suppression (RSLS), a mirror image of the IFF forward radiation patterns appearing 180 degrees out the back of the IFF antenna at lower power but still at a sufficient level to cause the interrogator to try to establish a link. ISLS and RSLS are typically ineffective in the rear hemisphere.

The problem with the mirror image appearing in the rear hemisphere is that in addition to a "ghost" being created on the IFF display, which may confuse the pilot, each target is processed twice, once when the antenna is pointed at the transponder and again when the mirror image pattern is pointed at the transponder. This cuts the target processing capability of the system in half. Also, if every transponder has to respond twice to every interrogator, it may not be available to respond to the real interrogations creating an aircraft awareness deficiency in today's high air traffic density.

The common technique to correct for the back lobe of an antenna is to use a backfill radiator. A backfill radiator is simply a smaller antenna located at the rear of the primary IFF antenna. Transmit power is coupled off the difference port and applied to the backfill radiator at a level sufficient to cover the back lobe present when transmit power is applied to the IFF antennas Sum port. This causes the Difference pattern to cover the Sum pattern radiation pattern out the rear of the antenna and restores the effectiveness of the ISLS and RSLS to 180 degrees out from the intended IFF link.

Therefore historically the use of the backfill radiator restores ISLS and RSLS effectiveness at the mirror angle of the main lobe, breaking the inadvertent IFF link at that angle thus preventing the IFF system from wasting computing resources attempting to link with a "ghost" signal. However, using the standard technique with small vertical aperture IFF antenna's typically used on airborne platforms, nulls can be generated in the difference pattern at other angles than 180 degrees in the rear hemisphere where the link can be re-established generating "ghosts". In cases where the front to back side lobe coupling is tight, the use of the backfill radiator generates nulls in the difference pattern at wide angles in the forward hemisphere, establishing the link at other angles than the mainlobe or mirror angle of the mainlobe. Again, this generates "ghosts". A backfill therefore eliminates the "ghost" at the mirror angle, but "ghosts" may now be generated at other angles. It therefore is not 100% effective. An example of a region outside the main lobe includes but is not limited to the side lobe and the back lobe.

SUMMARY OF THE INVENTION

The present invention is directed to an improved IFF system. The invention includes an antenna diversity method and system that compensates for the strong spatial back lobe present in small vertical aperture IFF antennas of the type typically used on aircraft. The present invention eliminates the "ghost" problem found in traditional IFF antennas. The present invention employs a Non-Reciprocal IFF antenna to modify the radiation patterns for Uplink and Downlink patterns so that the side lobe regions of the respective links are different. The use of a non-reciprocal antenna precludes the mirror image "ghost" without generating "ghosts" at other angles like the present art does. The present invention can be used in conjunction with ISLS and RSLS functions. When using ISLS and RSLS, the system of the present invention will only establish an IFF link in the main lobe region of the IFF antenna and will suppress links in the side lobes of the IFF antenna. The system of the present invention manipulates the sidelobes to preclude establishing either the uplink or the downlink.

An IFF link is a round trip between two devices which includes an uplink and a downlink (Interrogator to Transponder and Transponder to Interrogator). For the link to be established in either direction, the sum beam gain ($\Sigma$) must be greater than the difference beam gain ($\Delta$). The sum beam is the sum of the pattern that results from adding the power of the individual radiating elements in the array providing a mainlobe at zero degrees. The difference beam is the pattern that results by taking the difference between the sum of the individual radiating elements of the right half of the array and the sum of the individual elements of the left half of the array. This pattern results in a null at zero degrees. When the interrogator requests information from a target a "ghost" of the target may appear in the side lobe of the IFF antenna when the sum side lobe in the sum pattern exceeds the difference side lobe pattern and the angle at which this occurs is in the direction of a target. If this condition occurs, the interrogator will attempt to inadvertently create link with the target generating a "ghost". An inadvertent link is one that the IFF system attempts to create with the ghost a real target. If, for any given angle outside the main lobe, either the uplink or the downlink is broken then the inadvertent IFF link at that angle is broken also, thus preventing the IFF system from wasting computing resources attempting to link with a specious ghost signal or the confusion to the operator of dealing with the same target in multiple locations. An example of a region outside the main lobe includes but is not limited to the side lobe and the back lobe. The present invention eliminates the "ghost" problem by making the signal sent by the IFF antenna non-reciprocal which allows the ghost to be distinguished from the actual target and thus eliminates the creation of inadvertent links.

If the IFF antenna is not reciprocal in the side lobe region on transmit and receive, the round trip IFF link will never be established in the side lobe region. This is because a non-reciprocal IFF antenna modifies the side lobe structure from transmit to receive so that at any given angle the sum beam gain is not greater than the difference beam gain on both transmit and receive. This technique combines the forward looking IFF antenna array elements with additional elements to provide an IFF Uplink in the desired main lobe and a side lobe structure that may establish satellite uplinks at angles outside the main lobe. But unlike conventional IFF uplink and downlink signals, which are identical, this technique combines the elements for the IFF downlink signal sufficiently different so the main lobe is reciprocal but the side lobe structures are not precluding the round trip satellite IFF links.

DETAINED DESCRIPTION OF THE INVENTION

Figure 1:
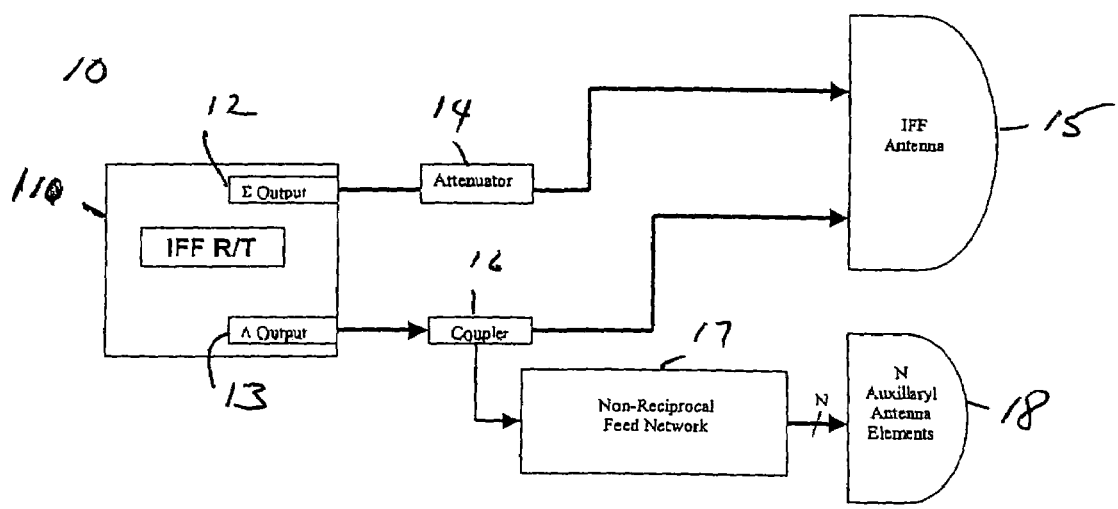
FIG. 1 is a block diagram of the Non-reciprocal IFF Antenna Technique of the present invention.

FIG. 1 depicts a representative block diagram for the system 10 employing a non-reciprocal antenna method of the present invention. The system includes an IFF Receiver/Transmitter 11 that generates an Σ signal 12 and a Δ signal 13. The Σ signal is sent to an Attenuator 14 and from there the Σ signal is then sent to the IFF Antenna 15. The number, type and configuration of the antennas making up the antenna may vary widely according to the particular application. However, in most aircraft, IFF antennas are small vertical aperture IFF antennas. The present invention is particularly advantageous with small vertical aperture IFF antennas. There may be one or more IFF antennas on the aircraft. Additionally, the overall height of the antenna(s) can vary as well. Where there are a plurality of antennas they can, if desired, be arranged in one or more rows. In one embodiment, where the number of rows of antenna elements is "n", the total height of the antenna containing n rows can be n(λ). In another embodiment the total height of the antenna(s) can be λ. In a still further embodiment, the height of the antenna(s) can be (λ/2) which for a single row is a very limited height antenna that will result in a strong backlobe.

The Δ signal is sent to a coupler 16. The coupler sends the Δ signal to both the IFF Antenna 15 and the Non-reciprocal Feed Network 17. The Non-reciprocal Feed network makes the uplink antenna side lobe pattern non-reciprocal to the downlink antenna pattern. The Non-reciprocal Feed network generates a non-reciprocal signal by using a technique including but not limited to one of the following: an Isolator, a switch, a filter, or the use of non-reciprocal phase lengths. A filter can be used to make the feed network non-reciprocal because the uplink operates at a frequency of 1030 MHz and the downlink operates at a frequency of 1090 MHz. The Δ signal is then sent to the N Auxiliary Antenna Elements 18. The N Auxiliary Antenna Elements transmits the non-reciprocal signal. Thus, the system may include separate transmit and receive antenna elements, and respective separate forward facing and rearward facing sets of one or more antennas may be provided.

The antennas are preferably highly directional or capable of being operated highly directionally so that responses from the IFF transponder are narrow beam, to provide better threat avoidance. The system can also provide, compared with conventional IFF responses, a much finer spatial response to military IFF interrogations, again providing better threat avoidance. The antenna may also comprise one or more phased array antennas.

The system may also include navigational and similar apparatus using the same antenna. Thus said system may include microwave landing systems (MLS) means under the control of said control means and receiving signals from said antenna means. Likewise the system may include distance measuring equipment controlled by said control means, with signals therefore being passed by said antenna.

Because the IFF antenna is typically mounted on the belly of the aircraft the height is limited, this length antenna is insufficient to keep the antenna pattern purely in the forward direction and creates a mirror image of the IFF forward radiation pattern 180 degrees out the back for the antenna at a reduced power. The mirror image of the forward radiation pattern is sufficient enough to create ghost images in the system, confusing the pilot and eating up computing resources of the IFF system.

The use of a non-reciprocal signal solves the problem which occurred in the prior art and eliminates the negative side effects that other solutions presented, unlike a back fill radiator which eliminates the problem of mirror image ghosts but moves the problem to other angles.

Figure 2:
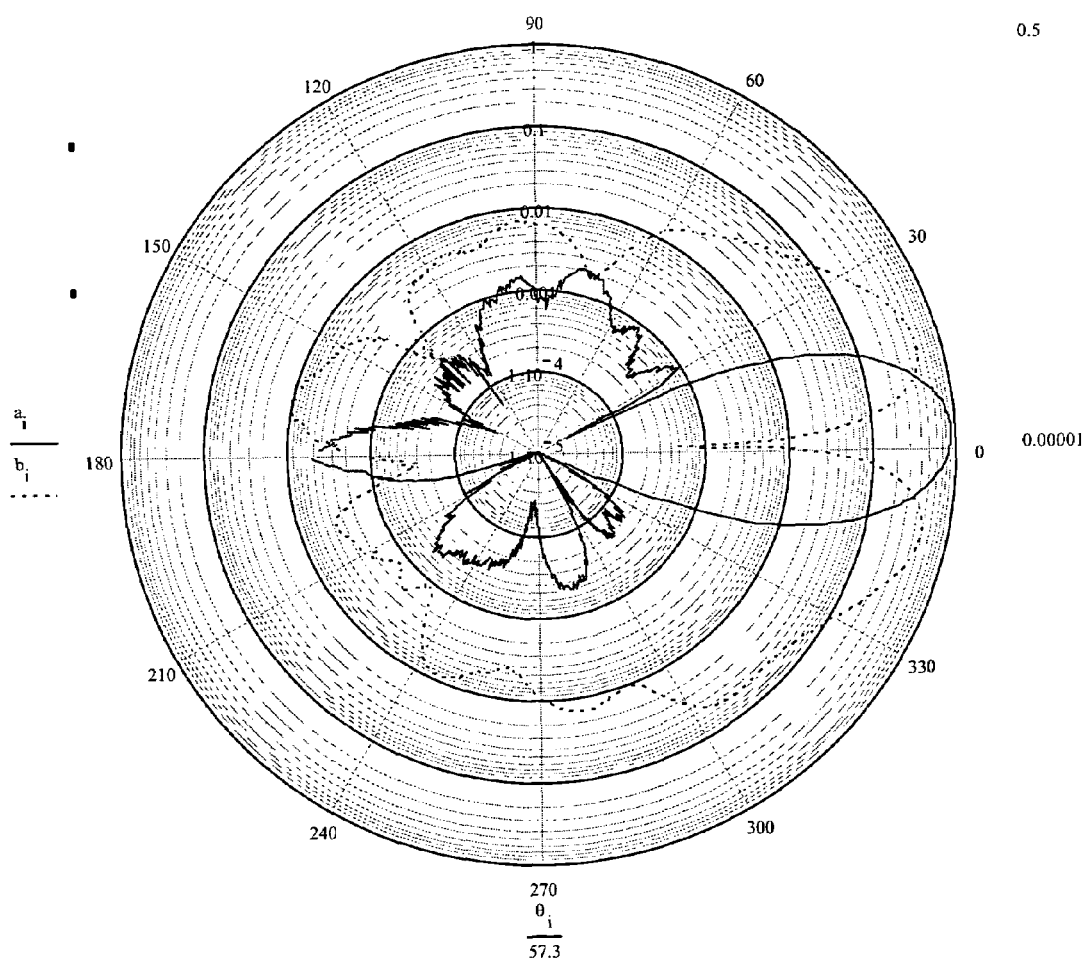
FIG. 2 shows the Uplink Σ (Sum) and Δ (Delta) patterns. They are the solid and dashed lines respectively. Note the back lobe of the Σ pattern being greater than the Δ pattern at 180 degrees from the mainlobe establishing an uplink on any target at zero degrees and 180 degrees.

FIG. 2 illustrates the Uplink Σ and Δ patterns. More particularly, FIG. 2 shows the sum pattern exceeding the delta pattern in the main lobe as required but also at the back lobe establishing the uplink twice.

Figure 3:
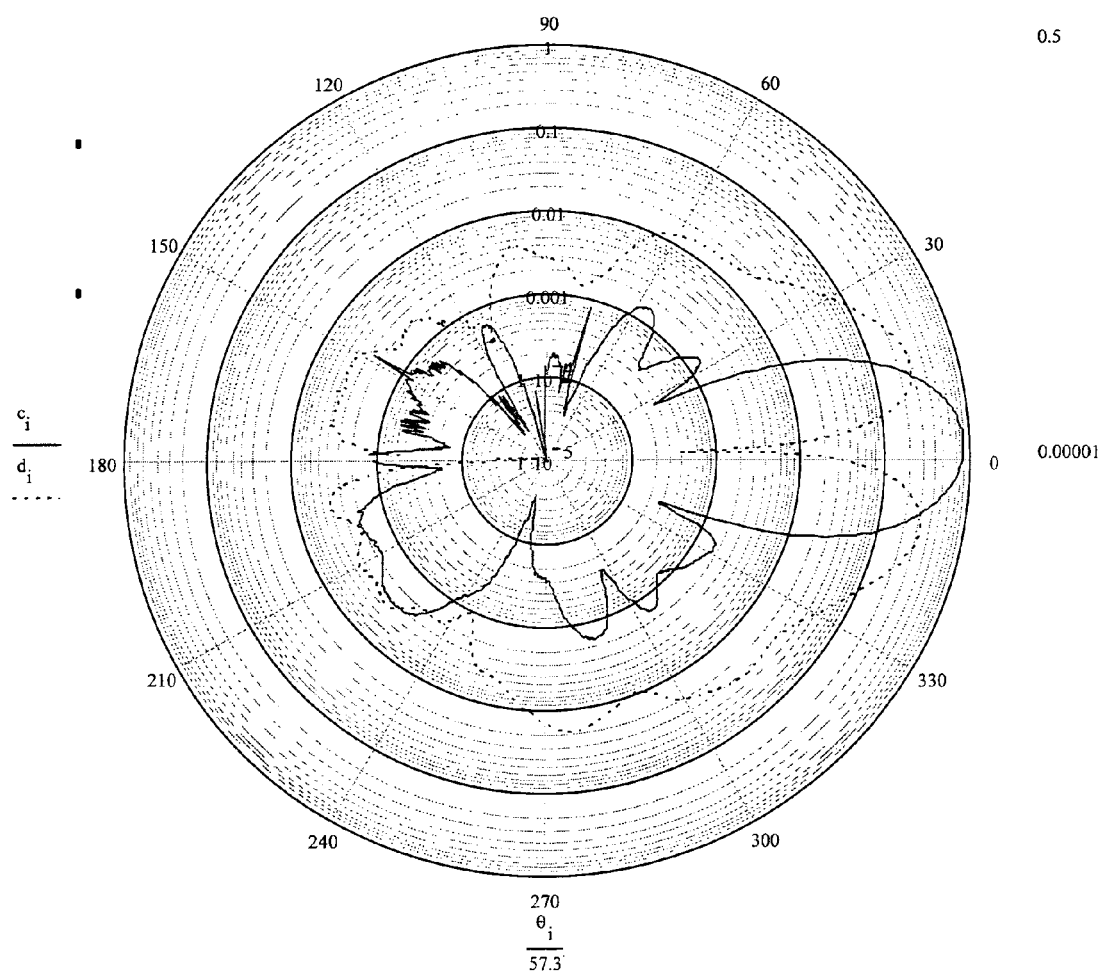
FIG. 3 shows the Downlink Σ (Sum) and Δ (Delta) patterns. They are the solid and dashed lines respectively. Note the back lobe of the Σ pattern being greater than the Δ pattern at 180 degrees from the mainlobe establishing an down link on any target at zero degrees and 180 degrees.

FIG. 3 illustrates the Downlink, Σ and Δ patterns. As seen in FIG. 3, the sum pattern exceeds the delta pattern in a similar fashion as in FIG. 2 but in the downlink pattern.

Figure 4:
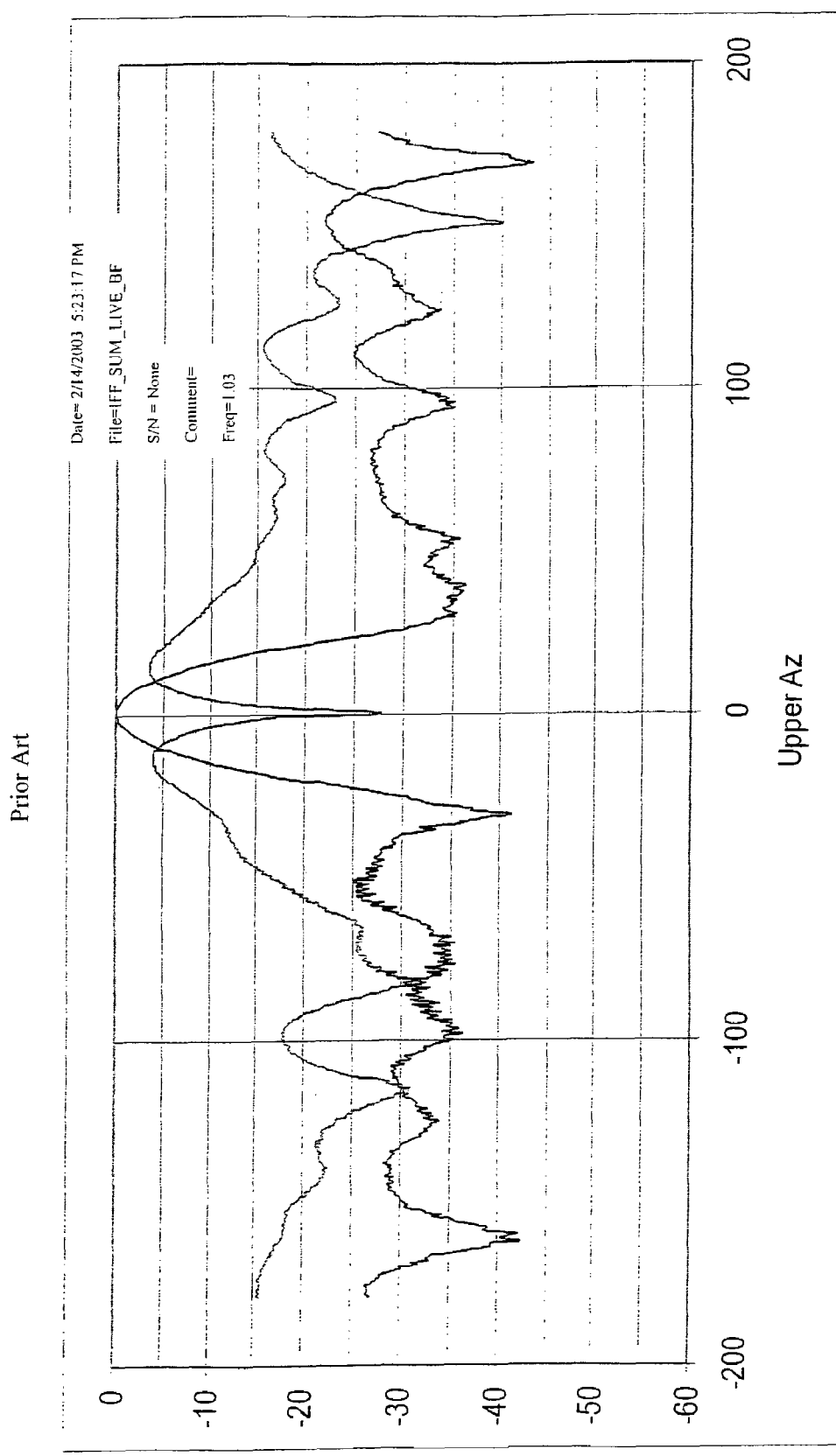
FIG. 4 shows a plot of the Uplink Σ (Sum) and Δ (Delta) patterns with the known art (Backfill Radiator). Note that the sum pattern back lobe (180 degrees) is now covered however the sum pattern now punches through the difference pattern in the sidelobes at 160 degrees establishing an uplink on any target at zero degrees and 160 degrees.

FIG. 4 illustrates a specious ghost signal in the side lobe. The data shown in FIG. 4 was taken at an antenna range with an IFF antenna and backfill. The Figure shows that although the backlobe (180°) is covered a new punch through in the Δ pattern exists at 160° for both uplink and down link.

Figure 5:
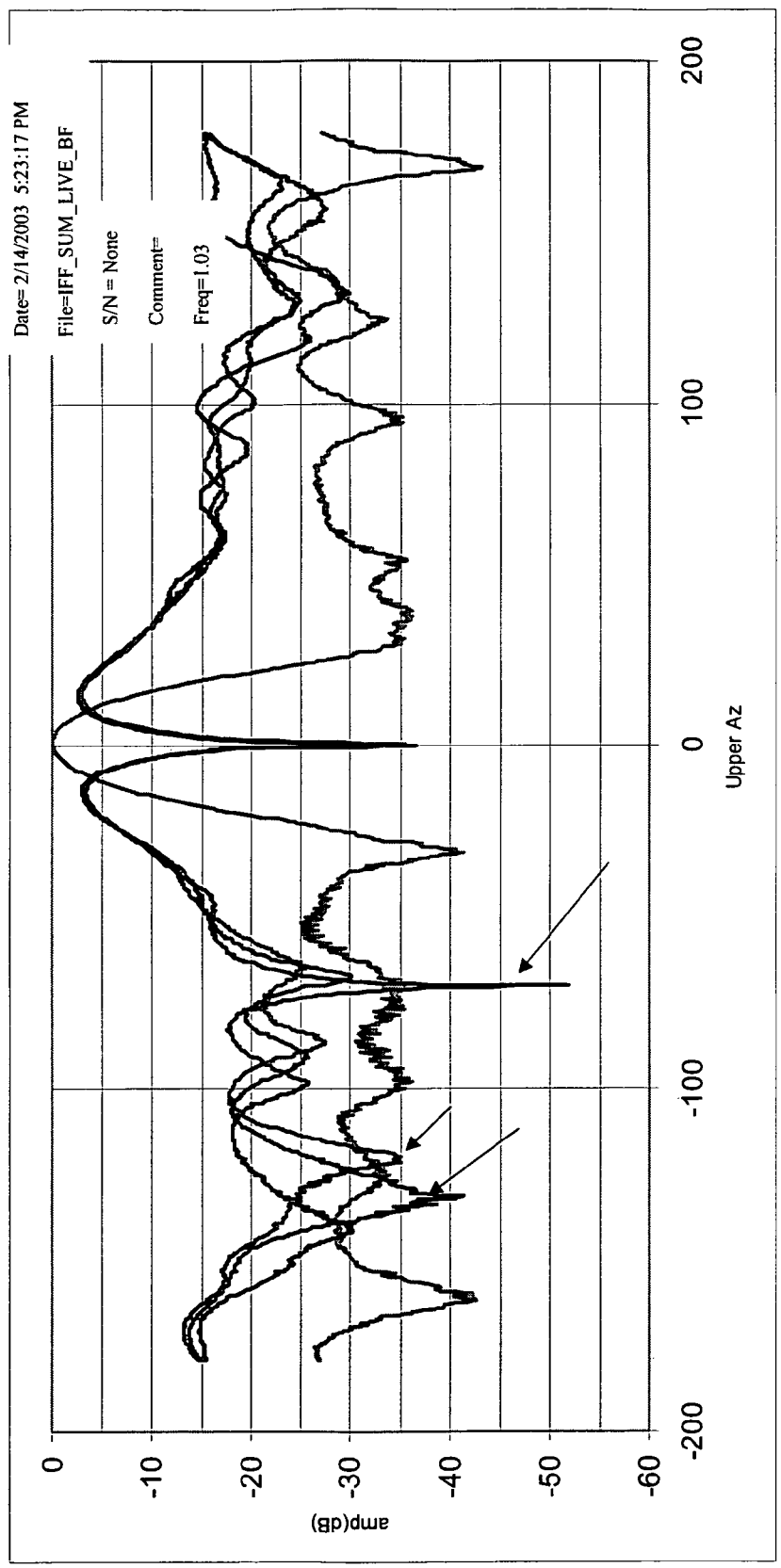
FIG. 5 shows plots of the Uplink Σ (Sum) and Δ (Delta) patterns with the known art (Backfill Radiator). The various difference patterns are due to varying the phase relationship between the backfill radiating elements and the main IFF Antennas (Forward) radiating elements. Note that in all the cases the sum pattern back lobe (180 degrees) is covered, however the sum pattern now punches through the difference patterns at varying angles in the sidelobes establishing uplinks on any target at zero degrees and other angles. These patterns demonstrates both the the limitation of the known art and the premise behind the non-reciprocal IFF antenna. That the antenna side lobe characteristics can be changed between transmit and receive, guaranteeing that a link will not be established in the side lobe region.

FIG. 5 illustrates various nulls in the side lobe. The various difference patterns are due to varying the phase relationship between the backfill radiating elements and the main IFF Antennas (Forward) radiating elements. Note that in all the cases the sum pattern back lobe (180 degrees) is covered, however the sum pattern now punches through the difference patterns at varying angles in the sidelobes establishing uplinks on any target at zero degrees and other angles. These patterns demonstrates both the limitation of the known art and the premise behind the non-reciprocal IFF antenna. That the antenna side lobe characteristics can be changed between transmit and receive, guaranteeing that a link will not be established in the side lobe region.

Figure 6:
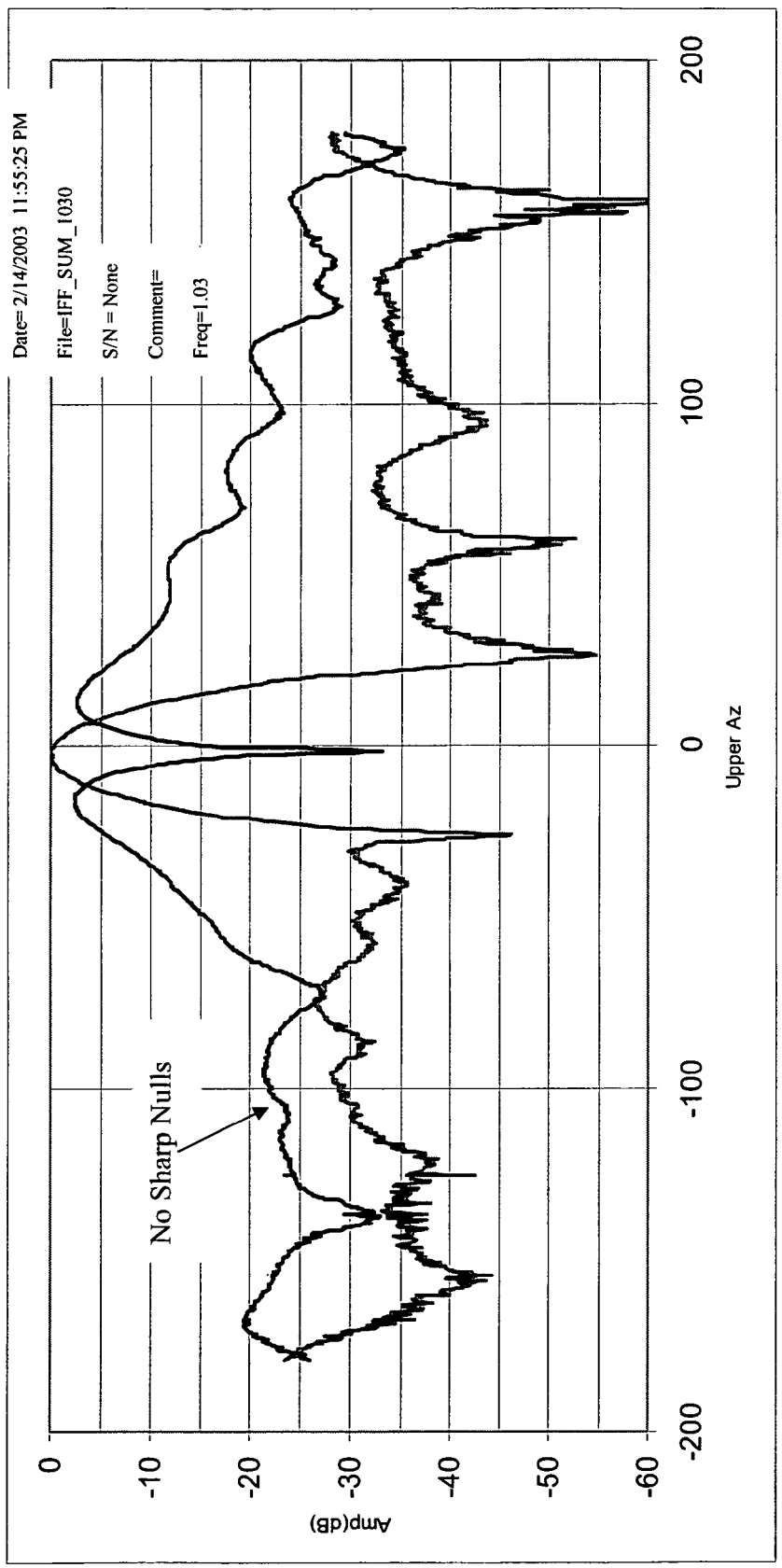
FIG. 6 show a plot of the front and side lobe radiation patterns using the present invention to eliminate both the ghost signal and the null.

FIG. 6 illustrates a signal generated using the present invention. Backfill is not required in the downlink or the receive mode in the present invention. This signal does not have the problem of either ghosts or nulls. This signal was generated by using a non-reciprocal signal, one in which the backfill was switched in for transmit and out for receive. This approach prevented the IFF from falsely interrogating transponders over the large angular extent of the back lobe, by breaking the uplink. Because the uplink is broken, the back fill is not required in the downlink mode. Either the uplink or the downlink can be broken.

I claim:

1. An IFF interrogation system for use on an aircraft, said system transmitting a signal from an interrogator to a transponder and a signal from said transponder to said interrogator, said system comprising
    an IFF transmitter and receiver, said IFF transmitter and receiver generating a sum signal and a difference signal,
    an IFF antenna, said IFF antenna establishing a link with said transponder and transmitting a sum and difference signal to said transponder, said IFF antenna receiving a signal from said transponder, said IFF antenna breaking said link via either an uplink signal or downlink signal when said uplink signal or said downlink signal has said difference signal greater than said sum signal at any given angle outside a main beam,
    a plurality of non-reciprocal auxiliary antenna elements, said non-reciprocal auxiliary antenna elements transmitting the difference signal, wherein at any given angle the sum beam gain is not greater than the difference beam gain on both transmit and receive.

2. The system according to claim 1 wherein said IFF transmitter and receiver sends said sum signal to an attenuator, said attenuator sends said sum signal to said IFF antenna.

3. The system according to claim 2 wherein said IFF transmitter and receiver sends said difference signal to a coupler and wherein said coupler sends said difference said IFF antenna and a non-reciprocal feed network.

4. The system according to claim 3 wherein said non-reciprocal feed network has a means for generating a plurality of non-reciprocal signals and sends said plurality of non-reciprocal signals to said plurality of non-reciprocal auxiliary antenna elements for transmission as a difference signal.

5. The system according to claim 1 wherein said IFF antenna has a small vertical aperture.

6. The system according to claim 5 wherein the vertical aperture is less than $\lambda/2$ tall.

7. The system according to claim 1 wherein the uplink or the downlink is broken in the side lobe beam.

8. The system according to claim 7 wherein an isolator is used to make the Uplink antenna side lobe pattern non-reciprocal to the downlink.

9. The system according to claim 1 wherein the IFF antenna is collocated with the radar antenna for an aircraft installation.

10. An IFF interrogation system for use on an aircraft, said system transmitting a signal from an interrogator to a transponder and a signal from said transponder to said interrogator, said system comprising
    an IFF transmitter and receiver, said IFF transmitter and receiver generating a sum signal and a difference signal,
    an IFF antenna, said IFF antenna establishing a link with said transponder and transmitting a sum and difference signal to said transponder, said IFF antenna receiving a signal from said transponder, said IFF antenna breaking said link via either an uplink signal or downlink signal when said uplink signal or said downlink signal has said difference signal greater than said sum signal at any given angle outside a main beam,
    a plurality of non-reciprocal auxiliary antenna elements, said non-reciprocal auxiliary antenna elements transmitting the difference signal, wherein IFF antenna array elements are combined so that the main lobe is reciprocal but the side lobes are not, thereby precluding round trip IFF links.

* * * * *

UNITED STATES PATENT AND TRADEMARK OFFICE
CERTIFICATE OF CORRECTION

PATENT NO. : 7,705,770 B2
APPLICATION NO. : 11/183569
DATED : April 27, 2010
INVENTOR(S) : Robert Wahl Page 1 of 1

It is certified that error appears in the above-identified patent and that said Letters Patent is hereby corrected as shown below:

In the Specification

Col. 1, line 5, please insert;

-- STATEMENT REGARDING FEDERALLY SPONSORED RESEARCH OR DEVELOPMENT

This invention was made with Government support under Contract No. N00019-93-C-0196 awarded by the Department of the Navy. The Government has certain rights in this invention. --

Signed and Sealed this
Thirteenth Day of August, 2013

Teresa Stanek Rea
*Acting Director of the United States Patent and Trademark Office*